United States Patent
Cheng et al.

(10) Patent No.: US 11,172,340 B2
(45) Date of Patent: Nov. 9, 2021

(54) SIDELINK TRANSMIT PROFILE MANAGEMENT FOR 5G NEW RADIO (NR)

(71) Applicant: QUALCOMM Incorporated, San Diego, CA (US)

(72) Inventors: Hong Cheng, Bridgewater, NJ (US); Sudhir Kumar Baghel, Hillsborough, NJ (US); Kapil Gulati, Hillsborough, NJ (US); Junyi Li, Chester, NJ (US); Zhibin Wu, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/688,327

(22) Filed: Nov. 19, 2019

(65) Prior Publication Data

US 2020/0162866 A1    May 21, 2020

Related U.S. Application Data

(60) Provisional application No. 62/769,969, filed on Nov. 20, 2018.

(51) Int. Cl.
*H04W 60/04* (2009.01)
*H04W 4/40* (2018.01)
(Continued)

(52) U.S. Cl.
CPC ............. *H04W 4/40* (2018.02); *H04W 28/24* (2013.01); *H04W 84/042* (2013.01)

(58) Field of Classification Search
CPC ..... H04W 88/06; H04W 92/18; H04W 48/10; H04W 48/12; H04W 4/40; H04W 72/042;
(Continued)

(56) References Cited

U.S. PATENT DOCUMENTS

2019/0306754 A1* 10/2019 Shan .................. H04L 65/80
2019/0313359 A1* 10/2019 Lee ................... H04W 4/42
(Continued)

OTHER PUBLICATIONS

3rd Generation Partnership Project; Technical Specification Group Services and System Aspects; Study on architecture enhancements for EPS and 5G System to support advanced V2X services (Release 16) 3GPP Standard; Technical Report; 3GPP TR 23.786, 3rd Generation Partnership Project (3GPP), Mobile Competence Centre, 650, Route Des Lucioles, F-06921 Sophia-Antipolis Cedex, France, vol. SA WG2, No. V0.7.0, Jul. 10, 2018 (Jul. 10, 2018), XP051474959, pp. 1-57, [retrieved on Jul. 10, 2018] p. 34, line 1-p. 35, line 25.
(Continued)

*Primary Examiner* — Phuc H Tran
(74) *Attorney, Agent, or Firm* — Qualcomm Incorporated

(57) ABSTRACT

Techniques are provided for supporting V2X communications which may be implemented in various apparatuses, methods, and/or articles of manufacture. In certain aspects an extended transmission profile may be determined to support V2X communications via 5G NR RATs between two or more wireless devices. For example, one or more processing units of a wireless device may determine that a NR RAT is requested for a V2X communication based, at least in part, on service information associated with data to be transmitted, determine an extended Tx Profile for the V2X communication, and initiate transmission of at least a portion of the data via the NR RAT using the transceiver based on the extended Tx Profile.

30 Claims, 5 Drawing Sheets

(51) Int. Cl.
*H04W 28/24* (2009.01)
*H04W 84/04* (2009.01)

(58) Field of Classification Search
CPC ... H04W 72/1284; H04W 92/10; H04W 4/12; H04W 4/42; H04W 4/70; H04L 5/0053
See application file for complete search history.

(56) References Cited

U.S. PATENT DOCUMENTS

2019/0313469 A1* 10/2019 Karampatsis ..... H04W 72/1242
2019/0394624 A1* 12/2019 Karampatsis ......... H04W 76/15

OTHER PUBLICATIONS

International Search Report and Written Opinion—PCT/US2019/062434—ISA/EPO—Feb. 12, 2020.

LG Electronics Inc: "PC5 RAT Selection", 3GPP Draft, R2-1818479_WASR2-1815426 PC5 RAT Selection, 3rd Generation Partnership Project (3GPP), Mobile Competence Centre, 650, Route Des Lucioles, F-06921 Sophia-Antipolis Cedex, France vol. RAN WG2, No. Spokane, USA, Nov. 12, 2018-Nov. 16, 2018 Nov. 2, 2018 (Nov. 2, 2018), XP051482338, pp. 1-3, Retrieved from the Internet: URL: http://www.3gpp.org/ftp/tsg%5Fran/WG2%5FRL2/TSGR2%5F104/Docs/R2%2D1818479%2Ezip [retrieved on Nov. 2, 2018] Section 2.

Qualcomm Incorporated: "RAT Selection for NR V2X Sidelink Communication", 3GPP Draft, R2-1815088 Discussion on RAT Selection for NR V2X, 3rd Generation Partnership Project (3GPP), Mobile Competence Centre, 650, Route Des Lucioles, F-06921 Sophia-Antipolis Cedex, France vol. RAN WG2, No. Chengdu, China, Oct. 8, 2018-Oct. 12, 2018 Sep. 28, 2018 (Sep. 28, 2018), XP051524455, pp. 1-3, Retrieved from the Internet: URL: http://www.3gpp.org/ftp/tsg%5Fran/wG2%5FRL2/TSGR2%5F103bis/Docs/R2%2D1815088%2Ezip [retrieved on Sep. 28, 2018] Section 2.

\* cited by examiner

US 11,172,340 B2

SIDELINK TRANSMIT PROFILE MANAGEMENT FOR 5G NEW RADIO (NR)

CLAIM OF PRIORITY UNDER 35 U.S.C. § 119

The present Application for patent claims the benefit of U.S. Provisional Patent Application No. 62/769,969 by CHENG et al., titled "SIDELINK TRANSMIT PROFILE MANAGEMENT FOR 5G NEW RADIO (NR)," filed Nov. 20, 2018, which is assigned to the assignee hereof, and expressly incorporated herein.

BACKGROUND

The following relates generally to wireless communications, and more specifically to sidelink (e.g. V2X) communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, communications may occur between vehicles and systems that use such communications. Accordingly, these systems may sometimes be referred to as vehicle-to-everything (V2X) communication systems. V2X communication links may convey important information to or from vehicles regarding inclement weather, nearby accidents, road conditions, and/or the activities of nearby vehicles, for example. V2X communication systems may also be used by autonomous or semi-autonomous vehicles (e.g., self-driving vehicles or vehicles that provide driver assistance) and may provide extra information beyond the reach of the vehicle's existing system. Such V2X communications links may provide certain safety-related information (e.g., location, direction of travel, velocity, etc.) in unencrypted messages so that other vehicles may receive such information.

SUMMARY

In accordance with certain aspects, a method may be provided for use at a user equipment (UE) to support V2X communication. The method may, for example, comprise determining that a NR RAT is requested for a V2X communication based, at least in part, on service information associated with data to be transmitted, determining an extended Tx Profile for the V2X communication, and transmitting at least a portion of the data via the NR RAT based on the extended Tx Profile. The method may, for example, support different types of V2X communication, including for example broadcast (multicast), unicast, and/or groupcast (e.g., platooning UEs, etc.). The method may, for example, support different QoS models such as per-packet QoS models, bearer QoS models, etc. The method may, for example, comprise a link management process to assist in determining an extended Tx Profile. For example, a link management process may employ RRC signaling, PC5 signaling, and/or the like to negotiate one or more parameters associated with a V2X communication and/or for use in determining an extended Tx Profile. The method may, for example, support backward compatibility with V2X communication via LTE RAT.

In accordance with another aspect, an apparatus and/or user equipment (UE) may be provided which comprises memory, a transceiver and one or more processing units coupled to the memory and the transceiver, and wherein the one or more processing units may be configured to determine that a NR RAT is requested for a V2X communication based, at least in part, on service information associated with data to be transmitted, determine an extended Tx Profile for the V2X communication, and initiate transmission of at least a portion of the data via the NR RAT using the transceiver based on the extended Tx Profile.

DETAILED DESCRIPTION

Figure 1:
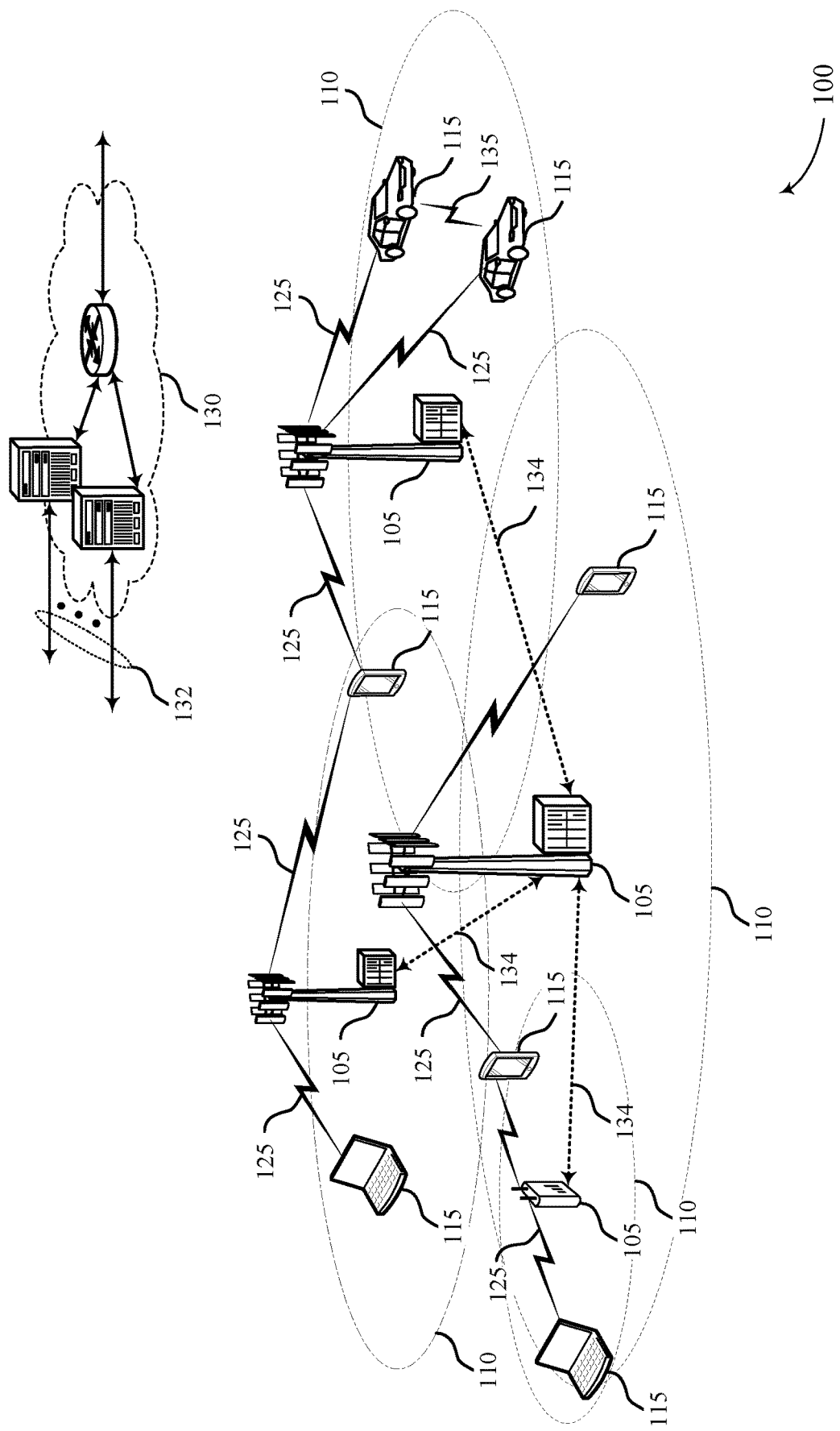
FIG. 1 illustrates an example of a system for wireless communications having user equipment (UE) configured for V2X communications or the like, in accordance with certain aspects of the present disclosure.

Some wireless communication systems may be used to facilitate communications with and/or between various devices, which may include UEs that may be provisioned in vehicles and these systems may support vehicle-to-everything (V2X) communications. As an example, UEs may employ V2X communication to convey information (data) between vehicles, etc. Some V2X communications may be unicast (e.g., between two UEs) or possible groupcast (e.g., between various UEs within a group, such as, a platoon, etc.). In still other instances, some V2X communications may be broadcast (e.g., one UE to many other devices). Accordingly, different Transmit (Tx) Profiles may be used to provide applicable communication resources to support different types of V2X communications.

It should be understood, that the term V2X communication as used herein is not intended to necessarily limit the techniques presented herein. Instead, the term V2X is used simply just to represent various forms of UEs, whether provisioned as part of the vehicle or other machine, carried by a person or animal, moving or stationary, etc. In certain instances, a V2X communication may referred to as a sidelink communication, with these terms being interchangeable.

Accordingly, a connection between two wireless devices (e.g., UEs) may be established that provides efficient techniques for sidelink communications (e.g., V2X communications). For example, a connection-oriented link may be established by a V2X layer of a communication protocol stack between the two wireless devices that supports an optimized access stratum (AS) layer configuration (e.g., over-the-air), e.g., possibly providing for higher throughput, supporting enhanced security protection, allowing more efficient resource usage, etc. To establish such a connection over a sidelink, a first UE may transmit a request message to a second UE, and the second UE may transmit a response message accepting the request to the first UE. Such exchanges may be part of a link management process. In certain instances, control information and data information may be exchanged over the same or different channels, etc.

Additionally, the first UE may transmit a connection complete message to the second UE and establish a security context with the second UE as part of establishing the connection over the sidelink. In some cases, the request message, the response message, and the connection complete message may be transmitted via radio resource control (RRC) signaling. Additionally, the connection may be established based on parameters (e.g., capabilities, connection parameters, etc.) for the first UE and/or the second UE that are transmitted in the respective request message and/or response message. For example, the parameters may include packet data convergence protocol (PDCP) parameters, radio link control (RLC) parameters, medium access control (MAC) layer parameters, physical (PHY) layer parameters, capabilities of one or more of the UEs, or a combination thereof. Hence, a link management process may be used to negotiate aspects/parameters associated with a V2X communication.

As described in greater detail herein, various techniques are presented that may be implemented in a UE to support V2X communication or the like, and particularly in networks employing one or more radio access technologies. By way of an example, as the transition from 4G/LTE enabled devices to 5G enabled device occurs, networks and UEs may be configured to support various radio access technologies, accordingly. Thus, in an example, a UE may be configured to support V2X communications via an LTE radio access technology (RAT) and/or a NR RAT. However, as might be expected, different communication standards may require UEs and other devices to operate differently. With this potential in mind, some of the techniques presented herein may be used to permit the use of different RATs, etc.

In one example, a UE may be configured to determine whether an LTE RAT or a NR RAT is requested for a V2X communication. Such a determination may be made, for example, based, at least in part, on a service identifier associated with data to be transmitted. As described in greater detail below, in certain implementations, such a determination may be made, at least in part, at a V2X layer (or the like) of a communication protocol stack. Here, for example, service information (e.g., a service identifier, etc.) may be provided to the V2X layer by another layer, such as, a (higher) application layer. Service information provided to or otherwise obtained by the V2X layer may be used, at least in part, to determine a Tx Profile for use in establishing the V2X communication via an LTE RAT. It has been common, therefore, for implementations of a V2X layer supporting 4G/LTE to simply obtain a Tx Profile from an application layer and to transparently pass it on to the AS layer (e.g., without modification, and possibly without interpreting its contents). However, with the addition of an NR RAT capability, a V2X layer may need to change behavior, e.g., to identify and operatively accommodate differences between RATs being supported. By way of example, it is expected that NR RAT capabilities may use more/different information than might an LTE RAT with regard to V2X communication. For example, additional/different QoS model(s) may be available, etc. As a result, in certain implementations a V2X layer may need to determine a particular RAT to use and/or the corresponding information needed by other layers to assist in establishing a V2X communication via that particular RAT.

In accordance with certain aspects, service information that is provided to or otherwise obtained at the V2X layer may be used, at least in part, by the V2X layer to determine an "extended Tx Profile" that can be provided to an access stratum (AS) layer. As presented herein, in certain implementations such a V2X layer or the like may be compatible with both LTE and NR. Thus, such a V2X layer may at times provide a Tx Profile that is compatible with an LTE RAT. However, at other times, such a V2X layer may provide an extended Tx Profile compatible with a NR RAT. For example, an extended Tx Profile may comprise different/additional information regarding NR in comparison to LTE.

Hence, an extended Tx Profile may be provided to one or more other layers of the communication protocol stack for use in establishing the V2X communication with one or more other devices (e.g., other UEs, etc.) via the NR RAT. For example, an extended Tx Profile may be provided to an AS layer or the like for use in establishing the V2X communication for broadcast (e.g., one to many) V2X communications.

Furthermore, as described herein, an extended Tx Profile may be based, at least in part, on information exchanged with one or more receiving devices, for example, as part of a link management process or the like, e.g., to support unicast or possibly groupcast V2X communications. For example, in certain implementations an RRC layer or the like RRC signaling may be used as part of a link management process to help negotiate/establish one or more parameters for use in a V2X communication via the NR RAT. In another example, a link management process, e.g., at the V2X layer or another layer, may use PC5 signaling to help negotiate/establish one or more parameters for use in a V2X communication via the NR RAT. Such link management processes may determine (e.g., consider, verify, negotiate, etc.) all or part of the information in an extended Tx Profile, which may result in the extended Tx Profile being ready for use in a V2X communication. Accordingly, in certain instances, an extended Tx Profile may be agreed to by the UE and a receiving device, such that the resulting V2X communication may be successfully performed.

In certain instances, an extended Tx Profile may be indicative of a quality of service (QoS) corresponding to the V2X communication. For example, a QoS may be indicative of a per packet QoS model, a bearer QoS model, etc. In some implementations, a QoS may be indicative of a 5G QoS Identifier (5QI) model. An extended Tx Profile may, for example, indicate whether a V2X communication comprises a broadcast communication, a unicast communication, or a groupcast communication. An extended Tx Profile may comprise a link management indicator in certain implementations. For example, an extended Tx Profile ma comprise one or more RRC parameters, or the like. In certain instances, again as described in greater detail herein, a service identifier that may be used, at least in part, to determine if an NR RAT may be desired may comprise a Provider Service Identifier (PSID), an Intelligent Transport Systems Application Identifier (ITS-AID), and/or the like.

In accordance with certain aspects, if a V2X communication comprises a broadcast communication, then in one example, a V2X layer may provide an applicable extended Tx Profile to an AS layer of a communication protocol stack for use in transmitting at least the portion of the data via the NR RAT.

In accordance with some aspects, if a V2X communication comprises either a unicast communication or a groupcast communication and an applicable extended Tx Profile indicates a per packet QoS Model, then in one example, a V2x layer may provide the extended Tx Profile to an AS layer of the communication protocol stack for use in transmitting at least the portion of the data via the NR RAT.

In accordance with an aspect, if a V2X communication comprises either a unicast communication or a groupcast communication and the applicable extended Tx Profile indicates a bearer QoS Model, then in one example, a V2X layer may provide at least a portion of the extended Tx Profile to an RRC layer of a communication protocol stack for use in establishing a verified Tx Profile via RRC signaling with at least one receiving device. The example V2X layer may subsequently provide at least a portion of the verified Tx profile to an AS layer of the communication protocol stack as part of the applicable extended Tx Profile for use in transmitting at least the portion of the data via the NR RAT.

In yet another example, if a V2X communication comprises either a unicast communication or a groupcast communication and the extended Tx Profile indicates a bearer QoS Model, then a V2X layer may further establish a verified Tx Profile via a link management communication process with at least one receiving device, and subsequently provide the at least a portion of the verified Tx Profile to an AS layer as part of an applicable extended Tx Profile for use in transmitting at least the portion of the data via the NR RAT. Here, for example, a link management communication process may be initiated by the V2X layer, and/or by another layer, such as, an application layer, wherein the link management communication process may comprise PC5 signaling. Thus, in certain example implementations, determining an extended Tx Profile for the V2X communication may comprise obtaining at least a portion of a verified Tx Profile at a V2X layer from another layer following the link management communication process.

Accordingly, in certain instances a verified Tx Profile may comprise at least one negotiated parameter for use in the V2X communication. In one example, a UE may participate in a platoon (e.g., grouping, set, etc.) of user equipments by way of unicast or groupcast communications. Here, for example, one or more parameters corresponding to the V2X communication may be negotiated with a leader (UE) of the platoon, etc., by way of a link management process.

Attention is now drawn to FIG. 1, which illustrates an example of a wireless communications system 100 that supports sidelink establishment in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

Wireless communications system 100 may support direct communication between UEs 115 over a sidelink 135 (e.g., using a peer-to-peer (P2P), device-to-device (D2D) protocol, ProSe direct communications). Sidelink communication may be used for D2D media-sharing, vehicle-to-vehicle (V2V) communication, V2X communication (e.g., cellular V2X (cV2X) communication, enhanced V2X (eV2X) communication, etc.), emergency rescue applications, etc. One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a first UE 115 of a sidelink connection) and a receiving device (e.g., a second UE 115 of a sidelink connection), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 or UE 115 may use multiple antennas or antenna arrays to conduct beamforming operations for directional communications with a UE 115 recipient. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105, a first UE 115, or a receiving device, such as a second UE 115) a beam direction for subsequent transmission and/or reception by the base station 105.

Some signals, such as data signals associated with a particular receiving device, may be transmitted by a base station 105 or a first UE 115 in a single beam direction (e.g., a direction associated with the receiving device, such as a second UE 115). In some examples, the beam direction associated with transmissions along a single beam direction may be determined based at least in in part on a signal that was transmitted in different beam directions. For example, a receiving UE 115 may receive one or more of the signals transmitted by a base station 105 or a transmitting UE 115 in different directions, and the receiving UE 115 may report to the base station 105 or the transmitting UE 115 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or PDCP layer may be IP-based. In cases where D2D or V2X communications are used, a V2X layer may provide related protocols, and in some cases may use ProSe direct communications protocols (e.g., PC5 signaling). An RLC layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the PHY layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, data transmissions (e.g., target traffic) may be periodically broadcasted from a UE 115 or base station 105. For example, in V2X communications, a vehicle (e.g., or a UE 115) may broadcast safety messages (with a known size) periodically to enable nearby vehicles, sensors, or additional UEs 115 to receive necessary information about the transmitting vehicle.

Wireless communications system 100 may support efficient techniques for establishing a unicast link (e.g., connection) between two wireless devices (e.g., UEs 115, vehicles, sensors, etc.). For example, a connection-oriented link may be established by a V2X layer of a protocol stack between the two wireless devices that supports an optimized AS layer configuration (e.g., over-the-air) for higher throughput (e.g., 64 quadrature amplitude modulation (QAM), CA, etc.), supports enhanced security protection, and allows more efficient resource usage (e.g., power control, beam management, etc.). In some cases, the unicast connection may be established over a sidelink 135 between the two wireless devices, for example, without going through a base station. To establish the unicast connection over the sidelink 135, a first UE 115 may transmit a request message to a second UE 115, and the second UE 115 may transmit a response message accepting the request to the first UE 115.

Additionally, the first UE 115 may transmit a connection complete message to the second UE 115 and establish a security context with the second UE 115 as part of establishing a connection over the sidelink 135. In some cases, the request message, the response message, and the connection complete message may be transmitted via RRC signaling (e.g., over PC5 to have unified PC5 and Uu management). Additionally, a connection may be established based on parameters (e.g., capabilities, connection parameters, etc.) for the first UE 115 and/or the second UE 115 that are transmitted in the respective request message and/or response message. For example, the parameters may include PDCP parameters, RLC parameter, MAC parameters, PHY layer parameters, capabilities of either UE 115, or a combination thereof. Such communications may be performed as part of a link management process.

Figure 2:
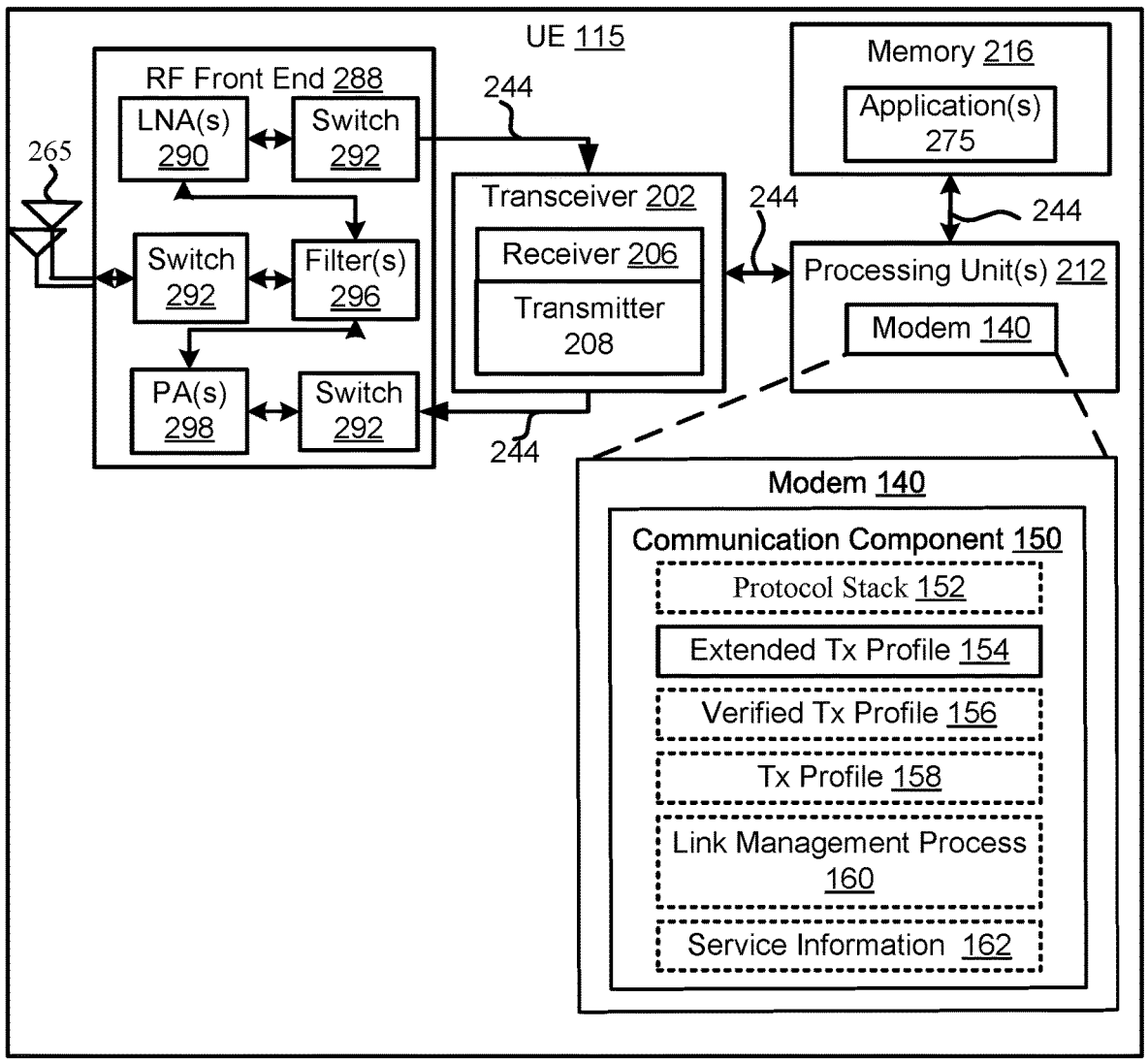
FIG. 2 is a block diagram illustrating some features of an apparatus for use in a UE configured for V2X communications or the like, in accordance with certain aspects of the present disclosure.

Attention is drawn next to FIG. 2, which is a block diagram illustrating some features of an example apparatus for use as or use in a UE 115 configured for V2X communications or the like, in accordance with certain aspects of the present disclosure.

Referring to FIG. 2, one example of an implementation of the UE 115 may include a variety of components including components such as one or more processing units 212 and memory 216 and transceiver 202 in communication via one or more buses 244, which may operate in conjunction with the modem 140 and the communication component 150 to enable one or more of the functions described herein related to V2X and related communications. Further, the one or more processing unit(s) 212, modem 140, memory 216, transceiver 202, RF front end 288 and one or more antennas 265, may be configured to support voice and/or data calls (simultaneously or non-simultaneously) in one or more radio access technologies.

In an aspect, the one or more processing unit(s) 212 may include modem 140 that uses one or more modem processors. The various functions related to a communication component 150 may be included or otherwise implemented, at least in part, in modem 140 and/or processing unit(s) 212 and, in an aspect, may be executed by a single processor, while in other aspects, different ones of the functions may be executed by a combination of two or more different processors. For example, in an aspect, the one or more processing unit(s) 212 may include any one or any combination of a modem processor, or a baseband processor, or a digital signal processor, or a transmit processor, or a receiver processor, or a transceiver processor associated with transceiver 202. In other aspects, some of the features of the one or more processing unit(s) 212 and/or the modem 140 associated with the communication component 150 may be performed by transceiver 202.

Also, memory 216 may be configured to store data used herein and/or local versions of applications 275 for the communication component 150 and/or one or more subcomponents of the communication component 150 being executed by at least one processing unit(s) 212. Memory 216 can include any type of computer-readable medium usable by a computer or at least one processing unit(s) 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining all or part of communication component 150 and/or one or more of its subcomponents, and/or data associated therewith, when UE 115 is operating at least one processing unit(s) 212 to execute the communication component 150 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 115 may include RF front end 288, which may operate in communication with one or more antennas 265 and transceiver 202 for receiving and transmitting radio transmissions, for example, wireless communications transmitted by at least one base station 105 or wireless transmissions transmitted by UE 115. RF front end 288 may be coupled with one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be coupled with a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processing unit(s) 212.

As such, transceiver 202 may be configured to transmit and receive wireless signals through one or more antennas 265 via RF front end 288. In an aspect, transceiver may be tuned to operate at specified frequencies such that UE 115 can communicate with, for example, one or more base stations 105 or one or more cells associated with one or more base stations 105. In an aspect, for example, the modem 140 can configure transceiver 202 to operate at a specified frequency and power level based on the UE configuration of the UE 115 and the communication protocol used by the modem 140. All or part of either or both, transceiver 202 and RF front end 288 may be configured, at least in part, as representing an NR RAT, and possibly also as representing an LTE RAT, and/or the like.

In an aspect, the modem 140 can be a multiband-multi-mode modem, which can process digital data and communicate with transceiver 202 such that the digital data is sent and received using transceiver 202. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of UE 115 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 115 as provided by the network during cell selection and/or cell reselection.

As illustrated in FIG. 2, an example communication component 150 may be configured to determine an extended Tx Profile 154, e.g., as previously mentioned for use in supporting V2X communication via an NR RAT. Similarly, in certain implementations communication component 150 may also be configured to determine or otherwise obtain a verified Tx Profile 156, e.g., which may comprise one or more negotiated parameters corresponding to a link management process 160. Further, in certain instances communication component 150 may determine or otherwise obtain a Tx Profile 158, e.g., as previously mentioned for use in supporting V2X communication via an LTE RAT. Also illustrated is a service information 162, which may be considered in determining whether a V2X communication should be supported with a particular RAT, e.g., NR RAT, LTE RAT, etc. Service information 162 may be representative any information that may be determined or otherwise obtained and used to inform a decision regarding a RAT selection to support V2X communication and/or link management process 160 in support thereof. It should be noted that, features in dashed lined boxes may be optional in certain implementations. Of course, features in solid lined boxes may also be optional in certain other implementations. Claimed subject matter is not intended to be as limited as the examples presented herein.

Figure 3:
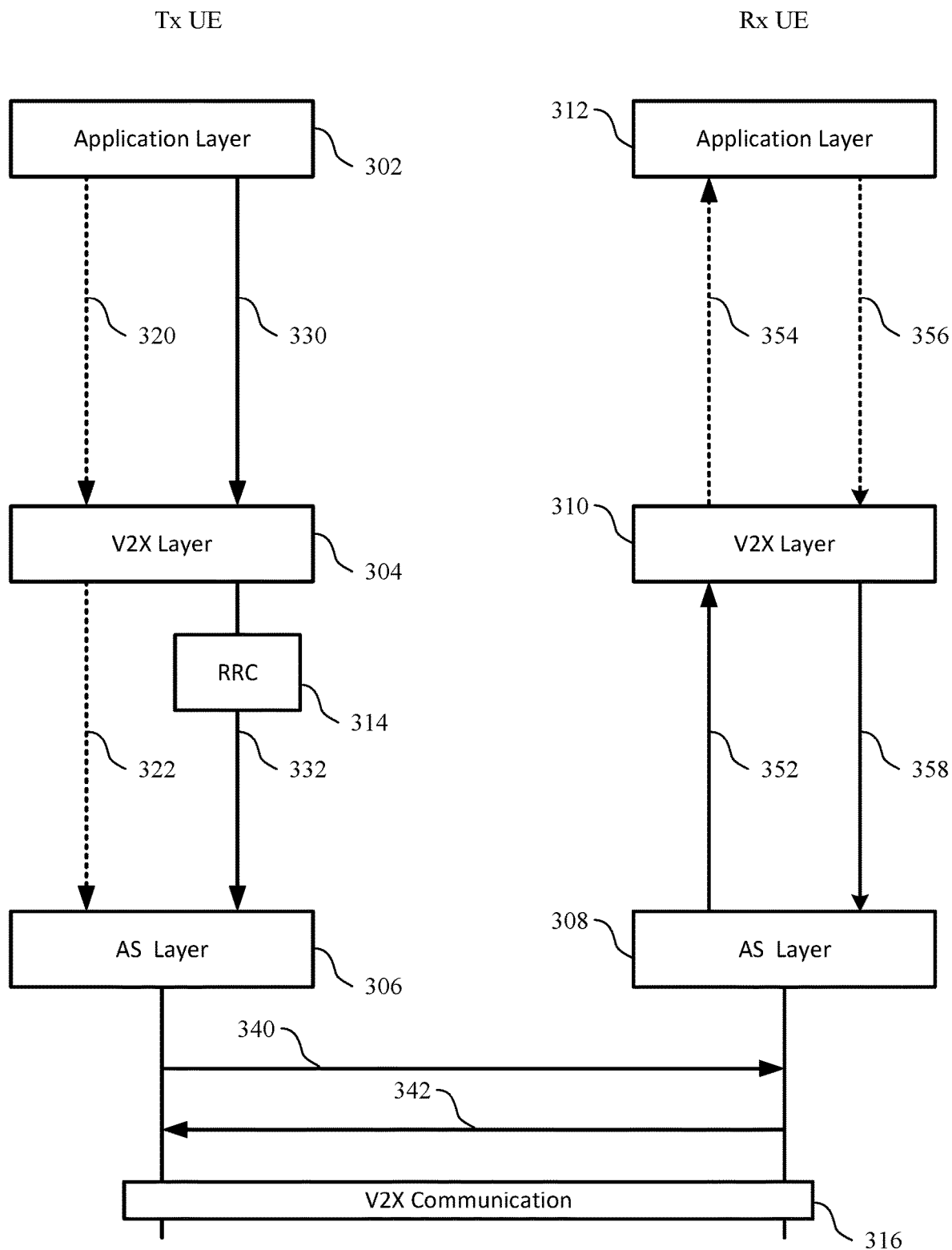
FIG. 3 illustrates portions of example communication protocol stacks in a transmitting UE and a receiving UE involved in V2X communications or the like using an extended Tx Profile supported, at least in part, by lower layer interactions, in accordance with certain aspects of the present disclosure.
Figure 4:
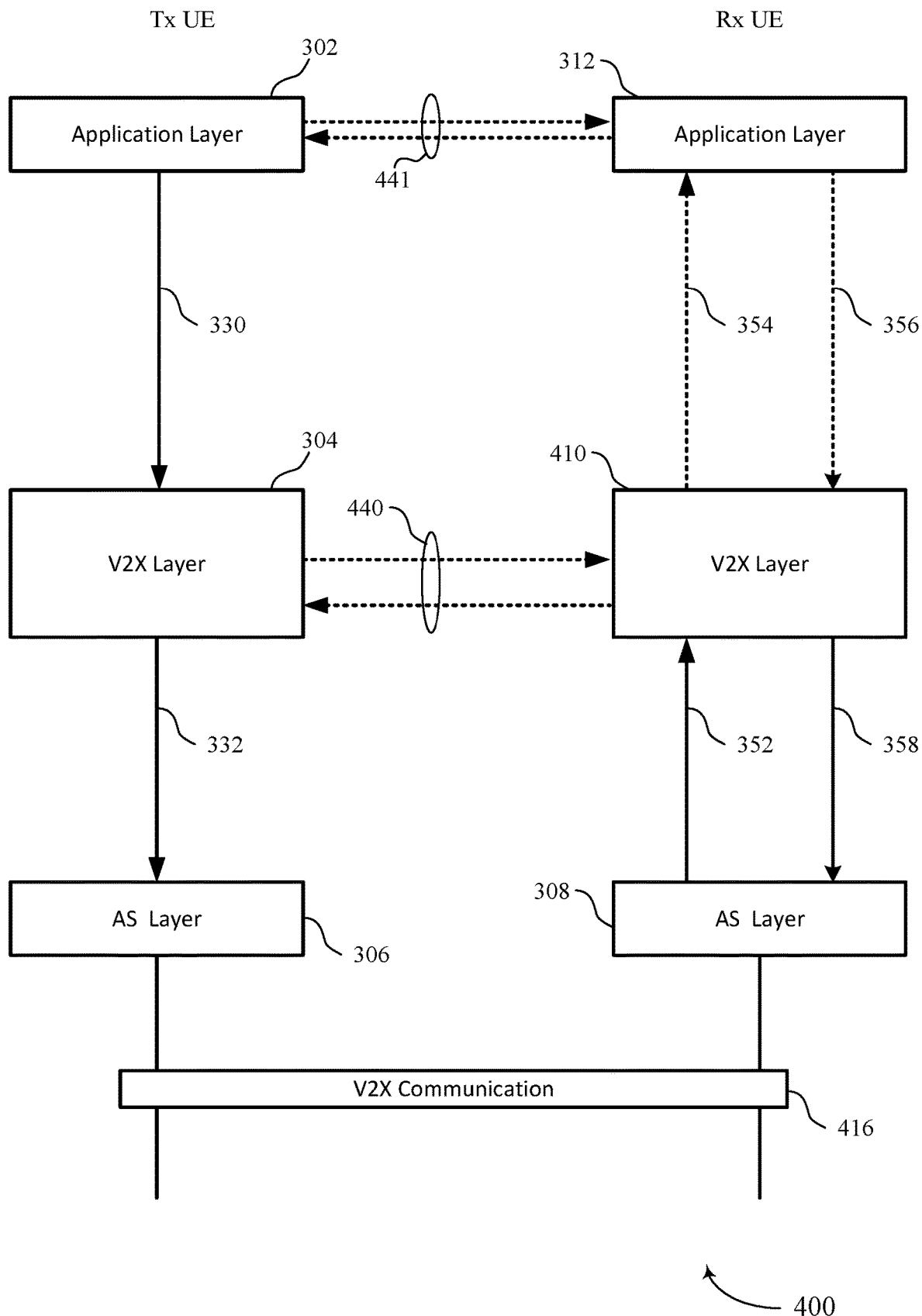
FIG. 4 illustrates portions of example communication protocol stacks in a transmitting UE and a receiving UE involved in V2X communications or the like using an extended Tx Profile supported, at least in part, by middle and/or upper layer interactions, in accordance with certain aspects of the present disclosure.

Communication component 150 is also illustrated as possibly including at least one protocol stack 152 all or part of which may be configured to support certain aspects of the techniques presented herein. FIG. 3 and FIG. 4, illustrate some example layers that may be represented in protocol stack 152. Those skilled in the art will clearly understand that other layers and/or functions may be provided as part of a protocol stack 152 and/or communication component 150. Again, claimed subject matter is not necessarily intended to be limited by such the examples.

With this in mind attention is drawn next to FIG. 3, which illustrates an environment 300 and portions of example communication protocol stacks in a transmitting (Tx) UE and a receiving (Rx) UE involved in V2X communications or the like using an extended Tx Profile supported, at least in part, by lower layer interactions, in accordance with certain aspects of the present disclosure.

The example Tx UE includes an application layer 302, a V2X layer 304, an AS layer 306, and an RRC layer 314. The example, Rx UE includes an application layer 312, a V2X layer 310 and an AS layer 308. As further illustrated, a V2X communication 316 between the Tx UE and Rx UE is shown as being supported by the AS layers (306 and 308).

Example LTE RAT Supported V2X Communication:

In a first example using FIG. 3, it will be assumed that application layer 302 provides information (including data to be transmitted) as represented by message 320 to V2X layer 304 corresponding to a V2X communication between the Tx UE and the Rx UE. For this example, it will be assumed that the information leads V2X layer 304 to determine that the V2X communication will be supported by an LTE RAT. For example, a service information 162 or the like in message 320 may inform such a decision. Accordingly, V2X layer 304 may pass a Tx Profile 158 (see FIG. 2) and data to be transmitted to AS layer 306, e.g., as represented by message 322. AS layer 322 may then proceed to establish/support V2X communication 316, and pass data to the Rx UE, e.g., through to AS layer 308. AS layer 308 may then pass data as applicable up through the protocol stack, e.g., as represented by message 352 to V2X layer 310. V2X layer 310 may then pass data as applicable to application layer 312, e.g., a represented by message 354. The example path may be reversed for data from the Rx UE to the Tx UE, e.g., via messages 356, 358, V2X communication 316, and back up through the protocol stack of Tx UE as applicable (representative messages not shown).

Example NR RAT Supported V2X Broadcast Communication:

In a second example using FIG. 3, it will be assumed that application layer 302 provides information (including data to be transmitted) as represented by message 320 to V2X layer 304 corresponding to a V2X communication between the Tx UE and the Rx UE. For this example, however, it will be assumed that the information leads V2X layer 304 to determine that the V2X communication will be supported by a NR RAT as a broadcast (e.g., multicast wherein the Rx UE is one of potentially many receiving devices). Accordingly, V2X layer 304 may pass an extended Tx Profile 154 (see FIG. 2) and data to be transmitted to AS layer 306, e.g., as represented by message 322. The decision at the V2X layer 304 may, for example, be based, at least in part, on information in message 320 from application layer 302. Here, for example, message 320 may comprise a service information 162 (e.g., a PSID, an ITS-AID, etc.). Additionally, service information 162 may comprise an indication of a QoS that may be supportable by the NR RAT. For example, message 320 may indicate a PPPP, a PPPR, a 5QI, etc. AS layer 322 may then proceed to establish/support V2X communication 316 via the NR RAT based on the extended Tx Profile (which may indicate the NR supported QoS), and pass data to the Rx UE, e.g., through to AS layer 308 of the Rx UE. AS layer 308 may then pass data as applicable up through the protocol stack, e.g., as represented by message 352 to V2X layer 310. V2X layer 310 may then pass data as applicable to application layer 312, e.g., a represented by message 354. The example path may be reversed for data from the Rx UE to the Tx UE, e.g., via messages 356, 358, V2X communication 316, and back up through the protocol stack of Tx UE as applicable (representative messages not shown).

Example NR RAT Supported V2X Unicast/Groupcast Communication with a Per-Packet QoS Model:

In a third example using FIG. 3, it will be assumed that application layer 302 provides information (including data to be transmitted) as represented by message 320 to V2X layer 304 corresponding to a V2X communication between the Tx UE and the Rx UE. For this example, however, it will be assumed that the information leads V2X layer 304 to determine that the V2X communication will be supported by a NR RAT as either a unicast or groupcast communication, and the V2X communication is to adhere to a per-packet QoS model. Here, V2X layer 304 may pass an extended Tx Profile 154 (see FIG. 2) and data to be transmitted to AS layer 306, e.g., as represented by message 322. The decision at the V2X layer 304 may, for example, be based at least in part on information in message 320 from application layer 302. Here, for example, message 320 may comprise service information 162 (e.g., a PSID, an ITS-AID, etc.). Additionally, service information 162 may comprise an indication of a QoS associated with the V2X communication. For example, service information 162 may indicate a PPPP, a PPPR, a 5QI, etc. AS layer 322 may then proceed to establish/support V2X communication 316 via the NR RAT based on the extended Tx Profile (which may indicate the NR supported per-packet QoS model), and pass data to the Rx UE, e.g., through to AS layer 308 of the Rx UE. AS layer 308 may then pass data as applicable up through the protocol stack, e.g., as represented by message 352 to V2X layer 310. V2X layer 310 may then pass data as applicable to application layer 312, e.g., a represented by message 354. The example path may be reversed for data from the Rx UE to the Tx UE, e.g., via messages 356, 358, V2X communication 316, and back up through the protocol stack of Tx UE as applicable (representative messages not shown).

Example NR RAT Supported V2X Unicast/Groupcast Communication with RRC Link Management (e.g., at the AS Layer) and Bearer QoS Model:

In a fourth example using FIG. 3, it will be assumed that application layer 302 provides information (including data to be transmitted) as represented by message 330 to V2X layer 304 corresponding to a V2X communication between the Tx UE and the Rx UE. For this example, however, it will be assumed that the information leads V2X layer 304 to determine that the V2X communication will be supported by a NR RAT as either a unicast communication or a groupcast communication, e.g., wherein the Rx UE is a participant, and wherein the V2X communication adheres to a bearer QoS model.

The determination at the V2X layer 304 regarding the extended Tx Profile may, for example, be based, at least in part, on information in message 320 from application layer 302. Here, for example, message 330 may comprise a service information 162 (e.g., a PSID, an ITS-AID, etc.). Here, service information 162 may also comprise an indication of a bearer QoS model that may be supportable by the NR RAT. V2X layer 304 may provide all of part of an (initial) extended Tx Profile to an RRC layer 314. Here, RRC layer 314 represents an ability to perform RRC communications 340 and 342 with a Rx UE as illustrated via AS layers.

The RRC communications 340 and 342 illustrate the Tx UE and Rx UE may negotiate or otherwise agree upon all or part of a verified Tx Profile 156 (see FIG. 2). Hence, the RRC communications are part of a link management process to support the V2X communication 316 adhering to a bearer QoS model. The verified Tx Profile 156 resulting, at least in part, from the link management process may, for example, be used by V2X layer 304 of the Tx UE to determine an extended Tx Profile 154 that may then be provided to AS layer 306 as represented by message 332 to enable AS layer 306 to provide the V2X communication 316. In certain implementations, a V2X layer or the like may determine all or part of an extended Tx Profile by mapping information determined or otherwise obtained to more specific NR RAT parameters that may be of use to one or more lower layers or the like, such as AS layer 306 accordingly.

With regard to the Rx UE in supporting a link management process via RCC signaling (e.g., represented by RRC communications 340 and 342), in certain implementations, AS layer 308 and possibly V2X layer 310 may consider all or part of an (initial) extended Tx Profile as provided by the Tx UE. In certain instances, application layer 312 may be configured to consider such information. Regardless of the layer(s) involved, in this example the Rx UE may support the link management process by negotiating, as applicable, to provide all or part of a verified Tx Profile back to the Tx UE. Thus, for example, the Rx UE may add or change one or more parameters or the like represented by the information returned via the verified Tx Profile. In certain instances, a verified Tx Profile may simply indicate agreement to all or part of an (initial) extended Tx Profile. In other instances, the negotiations may include additional back-and-forth exchanges of applicable information.

Example NR RAT Supported V2X Unicast/Groupcast Communication with PC5 Link Management (e.g., at the V2X Layer, or the Application Layer) and Bearer QoS Model:

Attention is drawn next to FIG. 4, which illustrates an environment 400 (similar to environment 300 in FIG. 3) showing portions of example communication protocol stacks in a Tx UE and a Rx UE involved in V2X communications or the like using an extended Tx Profile supported, at least in part, by middle (e.g., V2X layer) and/or upper layer (e.g., application layer) interactions, in accordance with certain aspects of the present disclosure.

Although not shown in complete detail in FIG. 3 and FIG. 4, it should be understood that information may be passed between different layers in a given protocol stack in the Tx UE and/or the Rx UE. Hence, the example representative messages illustrate just some of the potential interoperability and/or connection between the layers. Furthermore, it should be understood that while two or more layers may be functionally differentiated, they may nonetheless have some functionality that may be common or overlapping, etc.

In this (fifth) example, rather than use RRC signaling during a link management process, PC5 signaling may be used for link management. Thus, as illustrated by PC5 communications 440, the V2X layers 304 and 310 (or other like middle layers) may support a link management process to negotiate or otherwise determine an extended Tx Profile that may be passed to AS layer 306 of the Tx UE for use in establishing V2X communication 416. In an alternative example, as illustrated by PC5 communications 441, the application layers 302 and 312 (or other like upper layers) may support a link management process to negotiate or otherwise determine an extended Tx Profile that may be passed to AS layer 306 of the Tx UE for use in establishing V2X communication 416.

As part of such link management processes, information may be exchanged between different layers in a UE's protocol stack as may be necessary to determine one or more parameters that may allow the UE to support the V2X communication. For example, PC5 signaling at V2X layer 310 of the Rx UE for link management may include the use of one or more other layers, such as AS layer 308 and/or application layer 312, to assist in determining all or part of a verified Tx Profile or other like information to be sent back to the V2X layer 304 of the Tx UE. Likewise, for example, PC5 signaling at application layer 312 of the Rx UE for link management may include the use of one or more other layers, such as V2X layer 310 and AS layer 308, to assist in determining all or part of a verified Tx Profile or other like information to be sent back to the V2X layer 304 of the Tx UE.

Figure 5:
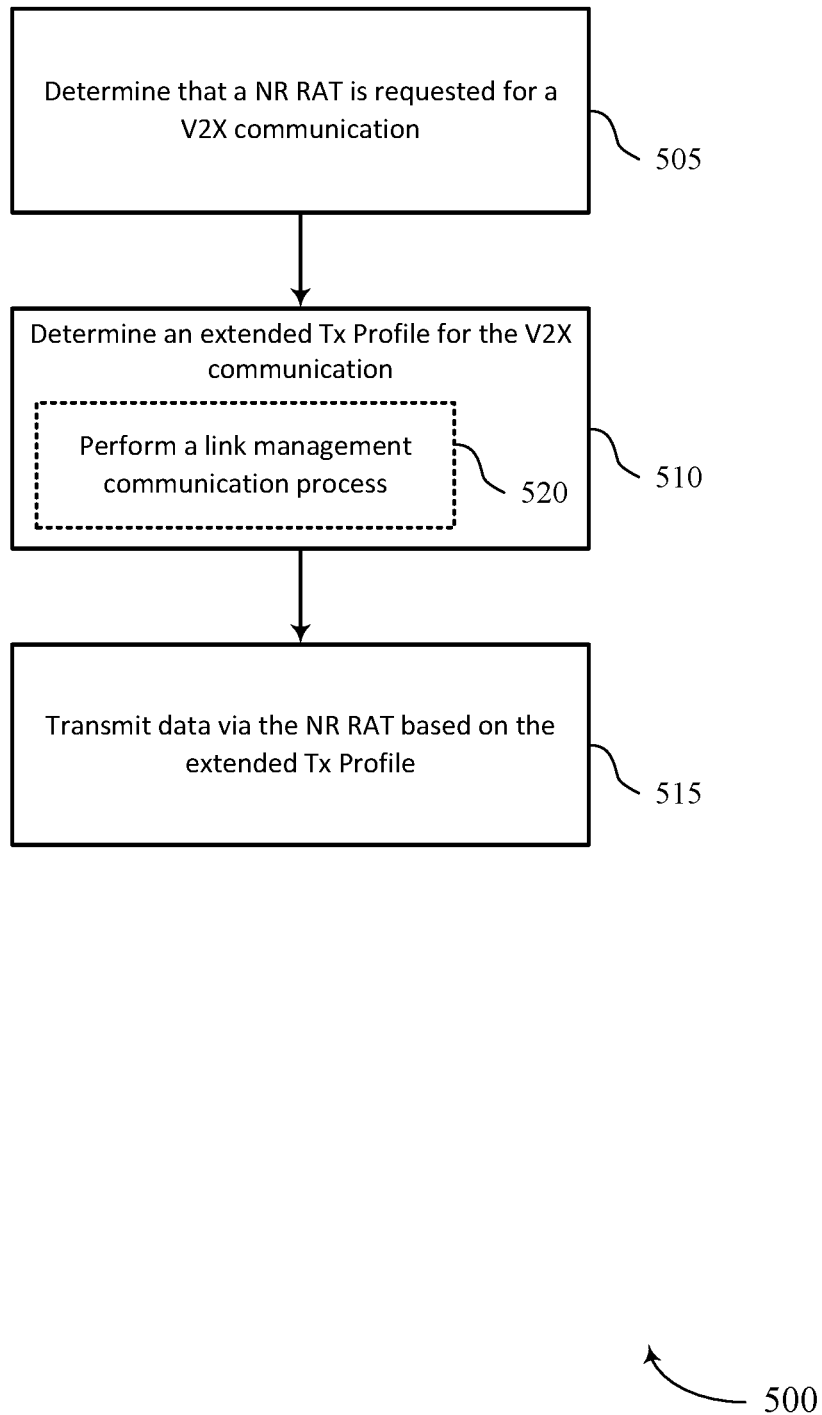
FIG. 5 is a flow-diagram illustrating an example method for use in an apparatus, for example, as in FIG. 2, in accordance with certain aspects of the present disclosure.

Attention is drawn next to FIG. 5, which is a flow-diagram illustrating an example method 500 for use in an apparatus and/or UE, for example, as in FIG. 2, in accordance with certain aspects of the present disclosure.

At example block 505, a determination may be made that a NR RAT is requested for a V2X communication. Here, for example, such a determination may consider a service identifier, a QoS, or both, and/or other types of service information that may be related to a requested V2X communication. As illustrated in FIG. 3 and FIG. 4, in certain implementations such a determination may be made by one or possibly more layers of a communication protocol stack, e.g., in response to a request and/or related service information obtained from one or possibly more other layers of the protocol stack. The service information that may be used in determining that a NR RAT is requested or may otherwise be of use/desire for a V2X communication may vary depending on the implementation of such layers and/or the like, and/or the capabilities of a UE. In some implementations, backward compatibility may be provided at block 505 to determine that an LTE RAT may be of use/desire for a V2X communication.

Based on block 505, at example block 510 a determination may be made as to an extended Tx Profile for the V2X communication via the NR RAT. All or part of an extended Tx Profile may be based, at least in part, on the service information related to the requested V2X communication. Further, in certain implementations other service information may be considered which may relate to the Tx UE, one or more intended receiver devices (e.g., a Rx UE), one or more wireless networks or other wireless environment considerations, etc. In certain implementations a mapping function may be implemented to determine all or part of an extended Tx Profile, e.g., based on such service information. In some examples, service information may lead to a link management process being performed as per (optional) example block 520 between a Tx UE and a Rx UE, e.g., to possibly negotiate and/or settle upon parameter(s) for use in a subsequent V2X communication. Some example link management processes comprise using RRC signaling and/or PC5 signaling, although claimed subject matter may not be so limited. As illustrated by some earlier examples herein, in one implementation all or part of an (initial) extended Tx Profile may be provided to a receiving device, and as a result of the link management process all or part of a verified Tx Profile may be settled upon the Tx UE and Rx UE, and based at least in part on the verified Tx Profile, an (final) extended Tx Profile may be determined and used for subsequent V2X communication.

At example block 515, data may be transmitted via the NR RAT based, at least in part, on the extended Tx Profile as determined at block 510. As illustrated in some earlier examples, in certain instances the V2X communication at block 515 may comprise broadcast transmissions, unicast transmissions, or groupcast transmissions.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the UEs may have similar frame timing, and transmissions from different UEs may be approximately aligned in time. For asynchronous operation, the UEs may have different frame timing, and transmissions from different UEs may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other PLD, discrete gate or transistor logic, discrete hardware components, or any combination thereof designed to perform the functions described herein, e.g., with regard to one or more processing units. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for use at a user equipment (UE), the method comprising:

determining that a radio access technology (RAT) is requested for a vehicle-to-everything (V2X) communication based, at least in part, on service information associated with data to be transmitted to one or more receiving devices;

determining an extended Tx Profile for the V2X communication;

establishing a verified Tx Profile via a communication process with at least one of the one or more receiving devices, wherein the communication process comprises a link management communication process, and wherein the determining the extended Tx Profile for the V2X communication comprises obtaining at least a portion of the verified Tx Profile at a V2X layer of a communication protocol stack from another layer of the communication protocol stack following the link management communication process; and transmitting at least a portion of the data by either a unicast transmission or a groupcast transmission via the RAT based, at least in part, on the extended Tx Profile and the verified Tx Profile as part of the V2X communication.

2. The method as recited in claim 1, wherein the service information comprises a Provider Service Identifier (PSID), or an Intelligent Transport Systems Application Identifier (ITS-AID), or a quality of service (QoS) indication, or some combination thereof.

3. The method as recited in claim 1, wherein the extended Tx Profile is indicative of a quality of service (QoS) corresponding to the V2X communication.

4. The method as recited in claim 1, wherein the extended Tx Profile indicates whether the V2X communication comprises the unicast communication or the groupcast communication.

5. The method as recited in claim 1, wherein determining the extended Tx Profile occurs, at least in part, at a V2X layer of a communication protocol stack.

6. The method as recited in claim 1, wherein the RAT comprises a new radio (NR) RAT.

7. The method as recited in claim 1, wherein the extended Tx Profile is provided to an access stratum (AS) layer of a communication protocol stack for use in the transmitting the at least the portion of the data.

8. The method as recited in claim 1, wherein the communication process comprises radio resource control (RRC) signaling with the at least one of the one or more receiving devices.

9. The method as recited in claim 1, wherein the link management communication process comprises PC5 signaling.

10. The method as recited in claim 1, wherein the verified Tx Profile comprises at least one negotiated parameter for use in the V2X communication.

11. The method as recited in 1, wherein the user equipment is part of a platoon comprising a plurality of user equipments, the V2X communication comprises the groupcast communication, and the at least one of the one or more receiving devices comprises a leader of the platoon of user equipments.

12. The UE as recited in claim 1, wherein the UE is part of a platoon comprising a plurality of user equipments, and the V2X communication comprises the groupcast communication, and the at least one of the one or more receiving devices comprises a leader of the platoon of user equipments.

13. A user equipment (UE) comprising:
memory;
a transceiver; and
a processing unit coupled to the memory and the transceiver, and configured to:
determine that a radio access technology (RAT) is requested for a vehicle-to-everything (V2X) communication based, at least in part, on service information associated with data to be transmitted to one or more receiving devices;
determine an extended Tx Profile for the V2X communication;
establish a verified Tx Profile through a communication process via the transceiver with at least one of the one or more receiving devices, wherein the communication process comprises a link management communication process, and wherein the extended Tx Profile for the V2X communication is determined using at least a portion of the verified Tx Profile obtained at a V2X layer of a communication protocol stack from another layer of the communication protocol stack following the link management communication process; and
initiate transmission of at least a portion of the data by either a unicast transmission or a groupcast transmission via the RAT using the transceiver based, at least in part, on the extended Tx Profile and the verified Tx Profile as part of the V2X communication.

14. The UE as recited in claim 13, wherein the service information comprises a Provider Service Identifier (PSID), or an Intelligent Transport Systems Application Identifier (ITS-AID), or a quality of service (QoS) indication, or some combination thereof.

15. The UE as recited in claim 13, wherein the extended Tx Profile is indicative of a quality of service (QoS) corresponding to the V2X communication.

16. The UE as recited in claim 13, wherein the extended Tx Profile indicates whether the V2X communication comprises the unicast communication or the groupcast communication.

17. The UE as recited in claim 13, wherein the processing unit is further configured to determine the extended Tx Profile, at least in part, at a V2X layer of a communication protocol stack implemented, at least in part, in the processing unit.

18. The UE as recited in claim 13, wherein the extended Tx Profile is used by an access stratum (AS) layer of a communication protocol stack implemented, at least in part, in the processing unit for use in the transmission of the at least the portion of the data via the transceiver.

19. The UE as recited in claim 13, wherein the communication process comprises radio resource control (RRC) signaling with the at least one of the one or more receiving devices.

20. The UE as recited in claim 13, wherein the link management communication process comprises PC5 signaling.

21. The UE as recited in claim 13, wherein the verified Tx Profile comprises at least one negotiated parameter for use in the V2X communication.

22. The UE as recited in claim 13, wherein the RAT comprises a new radio (NR) RAT.

23. An apparatus for use in a user equipment (UE), the apparatus comprising:
means for determining that a radio access technology (RAT) is requested for a vehicle-to-everything (V2X) communication based, at least in part, on service information associated with data to be transmitted to one or more receiving devices;
means for determining an extended Tx Profile for the V2X communication;
means for establishing a verified Tx Profile via a communication process with at least one of the one or more receiving devices, wherein the communication process comprises a link management communication process, and wherein the means for determining the extended Tx Profile for the V2X communication comprises means for obtaining at least a portion of the verified Tx Profile at a V2X layer of a communication protocol stack from another layer of the communication protocol stack following the link management communication process; and
means for transmitting at least a portion of the data by either a unicast transmission or a groupcast transmission via the RAT based, at least in part, on the extended Tx Profile and the verified Tx Profile as part of the V2X communication.

24. The apparatus as recited in claim 23, wherein the service information comprises a Provider Service Identifier (PSID), or an Intelligent Transport Systems Application Identifier (ITS-AID), or a quality of service (QoS) indication, or some combination thereof, and wherein the RAT comprises a new radio (NR) RAT.

25. The apparatus as recited in claim 23, wherein the extended Tx Profile is indicative of a quality of service (QoS) corresponding to the V2X communication.

26. The apparatus as recited in claim 23, wherein the extended Tx Profile is provided to an access stratum (AS) layer of a communication protocol stack for use in the transmitting the at least the portion of the data.

27. An article of manufacture comprising:
a non-transitory computer-readable medium comprising instructions implementable may one or more processing units of a user equipment (UE) to:
determine that a radio access technology (RAT) is requested for a vehicle-to-everything (V2X) communication based, at least in part, on service information associated with data to be transmitted to one or more receiving devices;
determine an extended Tx Profile for the V2X communication;
establish a verified Tx Profile via a communication process with at least one of the one or more receiving devices, wherein the communication process comprises a link management communication process, and wherein the extended Tx Profile for the V2X communication is determined using at least a portion of the verified Tx Profile obtained at a V2X layer of a communication protocol stack from another layer of the communication protocol stack following the link management communication process; and initiate transmission of at least a portion of the data by either a unicast transmission or a groupcast transmission via the RAT based, at least in part, on the extended Tx Profile and the verified Tx Profile as part of the V2X communication.

28. The article as recited in claim 25, wherein the service information comprises a Provider Service Identifier (PSID), or an Intelligent Transport Systems Application Identifier (ITS-AID), or a quality of service (QoS) indication, or some combination thereof, and wherein the RAT comprises a new radio (NR) RAT.

29. The article as recited in claim 27, wherein determining the extended Tx Profile occurs, at least in part, at a V2X layer of a communication protocol stack.

30. The article as recited in claim 27, wherein the verified Tx Profile comprises at least one negotiated parameter for use in the V2X communication.

* * * * *